US008505853B2

(12) United States Patent
Lagadec et al.

(10) Patent No.: US 8,505,853 B2
(45) Date of Patent: Aug. 13, 2013

(54) METHOD FOR CONTROLLING SATELLITE ATTITUDE, AND ATTITUDE-CONTROLLED SATELLITE

(75) Inventors: Kristen Lagadec, Toulouse (FR); Xavier Sembely, Centres (FR)

(73) Assignee: Astrium SAS, Paris (FR)

( * ) Notice: Subject to any disclaimer, the term of this patent is extended or adjusted under 35 U.S.C. 154(b) by 412 days.

(21) Appl. No.: 12/997,017

(22) PCT Filed: Jun. 3, 2009

(86) PCT No.: PCT/EP2009/056784
§ 371 (c)(1),
(2), (4) Date: Mar. 15, 2011

(87) PCT Pub. No.: WO2009/150081
PCT Pub. Date: Dec. 17, 2009

(65) Prior Publication Data
US 2011/0155858 A1 Jun. 30, 2011

(30) Foreign Application Priority Data

Jun. 9, 2008 (FR) ...................................... 08 53802

(51) Int. Cl.
*B64G 1/36* (2006.01)

(52) U.S. Cl.
USPC .............................. 244/171; 244/164; 244/168

(58) Field of Classification Search
USPC ........................... 244/171, 164, 168, 167, 166
See application file for complete search history.

(56) References Cited

U.S. PATENT DOCUMENTS 5,653,407 A * 8/1997 Bertheux et al. .............. 244/168
5,934,620 A * 8/1999 Abernethy .................... 244/168
6,076,773 A * 6/2000 Salvatore ...................... 244/164
8,056,863 B2 * 11/2011 Wang et al. ................... 244/164

FOREIGN PATENT DOCUMENTS

| EP | 338687 A2 * | 10/1989 |
| EP | 544198 A1 * | 6/1993 |
| EP | 0 807 578 A1 | 11/1997 |
| EP | 1 104 896 A1 | 6/2001 |
| WO | WO 9418073 A1 * | 8/1994 |
| WO | 00/26084 A1 | 5/2000 |

OTHER PUBLICATIONS

International Search Report, dated Sep. 23, 2009, from corresponding PCT application.
M. Bittner et al., "The Attitude Determination and Control Subsystem of the Intelsat V Spacecraft", Attitude and Orbit Control Systems, Proceedings of AOCS Conference, Nov. 3, 1977, pp. 1-20, XP-002016388; Cited in International Search Report.

* cited by examiner

*Primary Examiner* — Christopher P Ellis
(74) *Attorney, Agent, or Firm* — Young & Thompson

(57) ABSTRACT

A method for controlling the attitude of a satellite in orbit around a celestial object, the satellite including an observation instrument, a solar panel, a radiator and a star sensor which are arranged on the satellite such that, in a reference frame associated with the satellite and defined by three orthogonal axes X, Y, and Z, the observation instrument has its observation axis parallel to the Z-axis, the solar panel is parallel to the Y-axis, the radiator is arranged on one of the sides −X, +Y, or −Y of the satellite, and the star sensor points to the negative X values side. The roll and pitch attitudes of the satellite are controlled during an activity period to direct the observation instrument towards areas of the celestial object to be observed, and the yaw attitude of the satellite is controlled to keep the sun on the positive X values side and ensure that a solar panel minimum insolation constraint is satisfied during observation phases of the activity period.

20 Claims, 4 Drawing Sheets

METHOD FOR CONTROLLING SATELLITE ATTITUDE, AND ATTITUDE-CONTROLLED SATELLITE

The present invention belongs to the field of satellites in orbit around a celestial object, and relates more specifically to the attitude control of such satellites to meet the power, heat dissipation and exclusion constraints related to the Sun.

Satellites observing the celestial object around which they are in orbit have an active onboard payload comprising at least one observation instrument pointing towards said celestial object, whose electrical supply is usually provided by solar generators comprising one or more solar panels and whose optimal operation is achieved when the Sun's rays are substantially orthogonal to the solar panels' active surface.

For Earth observation, satellites are nowadays placed in geostationary orbits or near-geostationary orbits (for the orbit plane is only slightly inclined with respect to the equatorial plane, in practice by an angle of less than 15°).

For satellites placed in such orbits, the necessary orientation of the solar panels with respect to the Sun is usually obtained both by controlling the attitude of said satellites and by rotating said solar panels around one or more axes by providing said solar panels with one or more drive mechanisms (called SADM—Solar Array Drive Mechanisms).

Figure 1A:
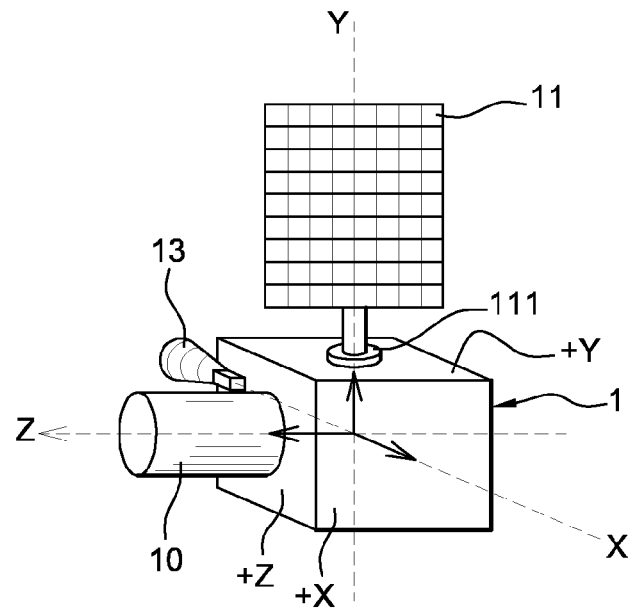
Figure 1B:
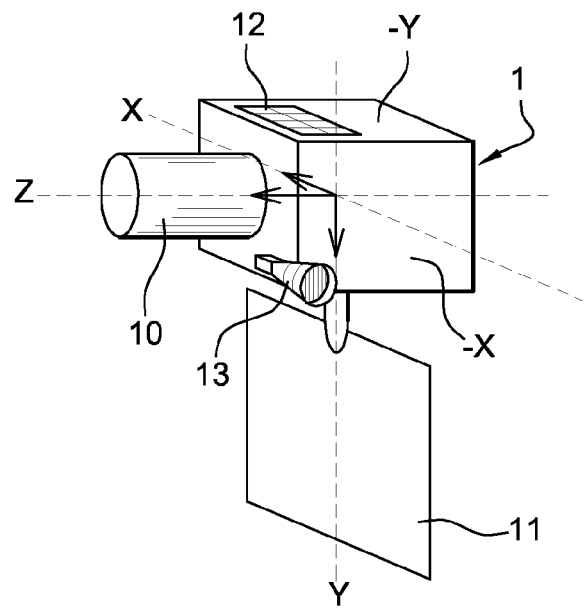

FIGS. 1a and 1b show an example of a satellite 1, representative of the installation of equipments of such satellites, comprising in particular an observation instrument 10 and a solar panel 11.

A reference frame associated with the satellite 1 is defined by three oriented orthogonal axes, commonly called roll axis X, pitch axis Y and yaw axis Z.

The Z-axis corresponds for example to the pointing direction of the observation instrument 10. The Y-axis corresponds for example to an axis of rotation of the solar panel 11, equipped with a SADM 111.

The observation satellites concerned by the invention are those that use pointing of the entire satellite to target different areas to be observed on the Earth's surface, i.e. that point the Z-axis of the observation instrument 10 towards said areas, by controlling the satellite's pitch (rotation around the Y-axis) and roll (rotation around X-axis) attitudes.

In addition, the satellites more specifically concerned by the invention perform their Earth observation mission during an activity period that represents a significant percentage of the orbital period's time, typically between 50% and 70% of said orbital period; the activity period is defined as a period during which satellite attitude maneuver phases alternate with observation phases.

The attitude of satellites placed in geostationary orbit (in particular telecommunications satellites), is usually controlled so as to maintain the satellite's Y-axis orthogonal to the orbital plane at all times. This solution is not appropriate because it only provides a degree of freedom (around the pitch axis) to point the Z-axis towards the different areas to be observed.

Current Earth observation satellites, placed in an inclined orbit, observe the Earth for a limited percentage of the orbital period's time, so that the solar panel's insolation is optimized only outside the activity period.

This solution is not suitable for observation satellites that observe the Earth for 50% or more of the orbital period, and must therefore ensure the solar panel's insolation also during activity periods, in order to provide electrical power to the payload.

In addition, current attitude control laws only reflect the constraints associated with insolation of the solar panel to the Sun, while the correct operation of other equipment also depends on constraints linked to the Sun. This applies, for example, to the radiators designed to remove the heat generated by the satellite's equipments, whose heat rejection capacity depends on the solar flux they absorb, and also to star sensors, used in particular to estimate the attitude of satellites, which star sensors must not be pointed towards the Sun.

Currently therefore, there is no effective law to control the attitude of Earth observation satellites observing different areas on the Earth's surface for long activity periods, that satisfies the various constraints linked to the Sun during said activity periods.

The present invention solves the above-mentioned problems by introducing a method for controlling the attitude of a satellite in orbit around a celestial object, to be implemented by a satellite comprising at least one observation instrument, a solar panel, a radiator and a star sensor arranged on the satellite such that, in a reference frame associated with said satellite and defined by three orthogonal axes X, Y, and Z:
- the observation axis of the observation instrument is parallel to the Z-axis,
- the solar panel is parallel to the Y-axis,
- the radiator is arranged on one of the sides −X, +Y, or −Y of the satellite,
- the star sensor is directed toward the half space corresponding to the negative X values.

According to the method, during an activity period, the attitude of the satellite is controlled in roll around the X-axis and pitch around the Y-axis to point a direction $\vec{z}(t)$ of the observation instrument's observation axis towards one or more of the celestial object's areas to be observed. The yaw attitude around the satellite's Z-axis is controlled to keep the Sun on the side of the half-space corresponding to positive X values and to ensure that a solar panel minimum insolation constraint C1 is satisfied during the observation phases of the activity period, to provide electrical power to the satellite payload during the observation phase.

Preferably, the satellite's yaw attitude is also controlled such that a radiator maximum insolation constraint C2 and/or a star sensor maximum insolation constraint C3 are satisfied during the observation phases, to ensure heat dissipation by the radiator and protection of the star sensor, respectively.

To limit potential mechanical disturbances during the observation phase, the satellite's yaw attitude and/or solar panel orientation is, in particular modes, substantially constant during at least one observation phase.

In a particular implementation of the method, the satellite's yaw attitude is controlled during the activity period such that a direction $\vec{y}(t)$ of the Y-axis is oriented in accordance with the cross product:

$$\vec{y}(t) = \alpha \vec{z}(t) \wedge \vec{s}(t),$$

where $\alpha$ is a normalization factor and $\vec{s}(t)$ is the direction of the Sun relative to said satellite.

According to other modes of implementation of the method, the yaw attitude of the satellite is controlled during the activity period such that:
- a norm of yaw variations made between predefined moments of said activity period is minimized,
- only rotations in multiples of 90° are allowed,
- only rotations in multiples of 180° are allowed.

The invention also relates to the satellite comprising a guidance and attitude control system of said satellite and attitude-controlled according to the method.

The yaw attitude of the satellite is controlled along a yaw trajectory that is determined either by the satellite's means of computation, or downloaded from a base station via said satellite's means of downloading.

A particularly advantageous arrangement of the attitude controlled satellite according to the method consists of placing the radiator on the −X side of said satellite.

In the case where the satellite's solar panel is fixed, except possibly during deployment operations, said solar panel is arranged such that a direction normal to an active surface of said solar panel makes an angle of between 90° and 180° with the direction of the Z-axis.

In the case where the satellite comprises a plurality of fixed solar panels, except possibly during deployment operations, these are arranged such that a mean direction of directions normal to the active surfaces of said solar panels, possibly weighted by the areas of the solar panels, makes an angle of between 120° and 150° with the direction of the Z-axis.

Figure 2A:
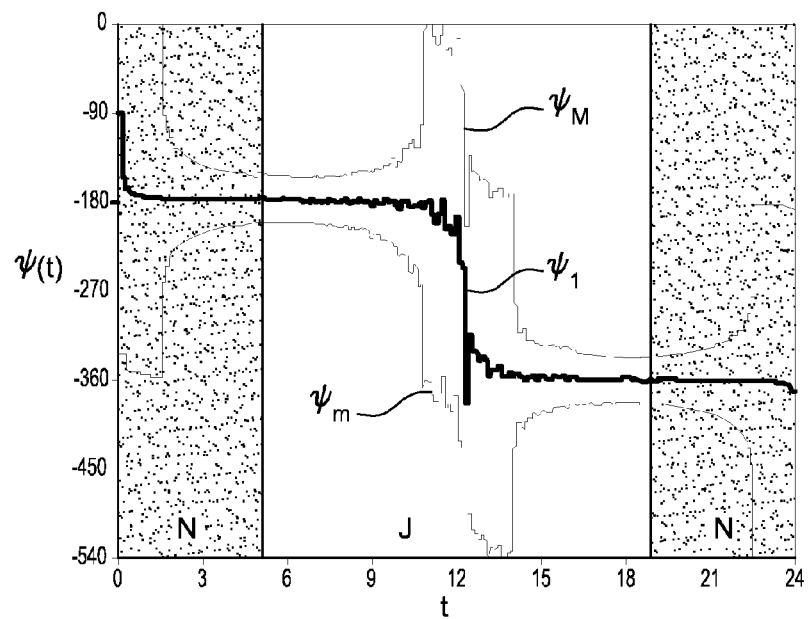
Figure 2B:
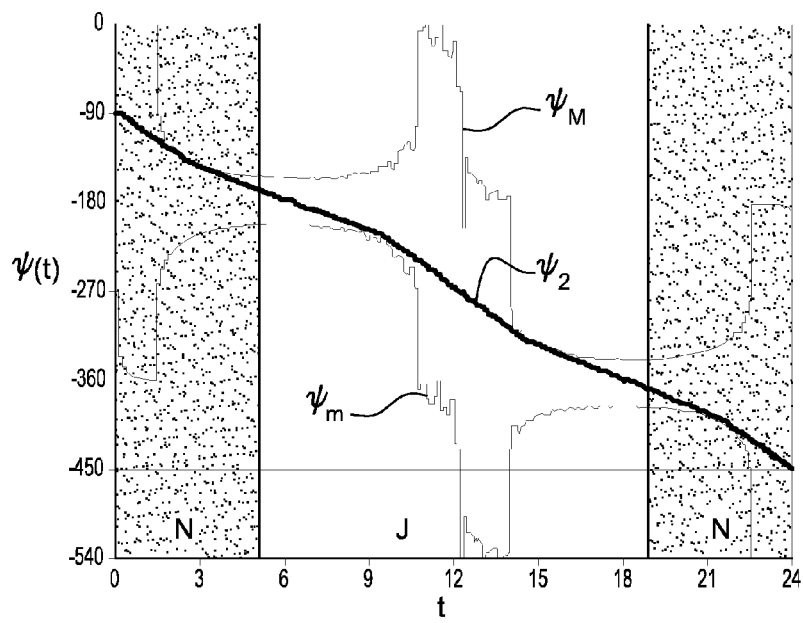
Figure 2C:
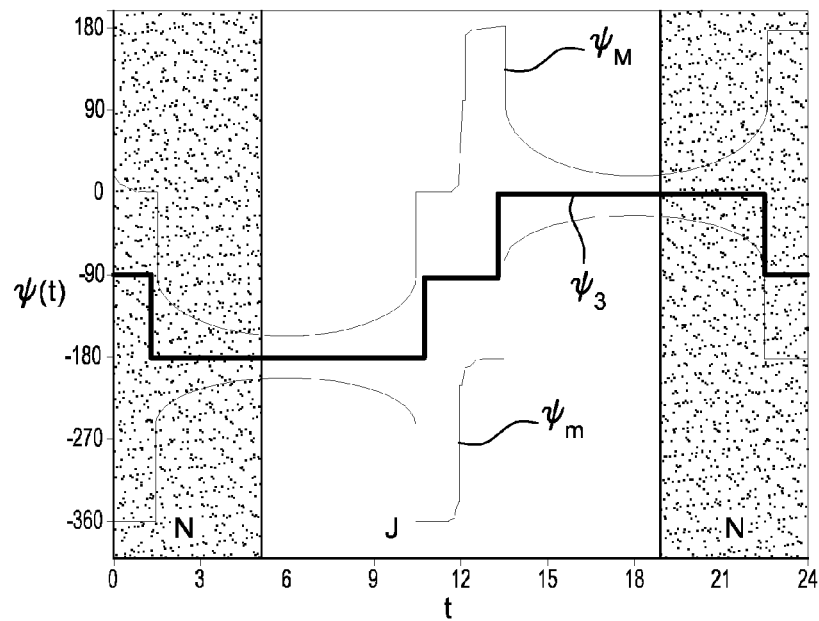
Figure 2D:
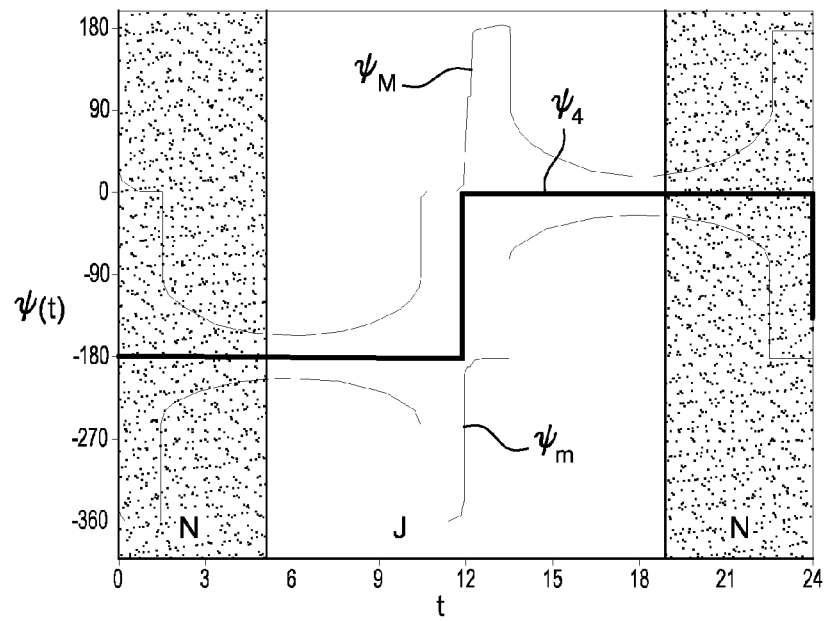
Figure 3A:
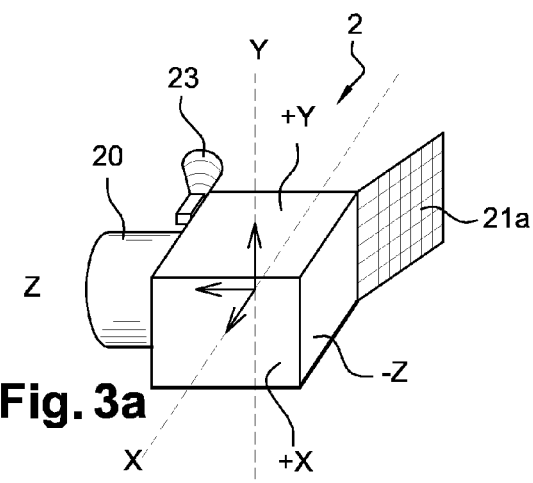
Figure 3B:
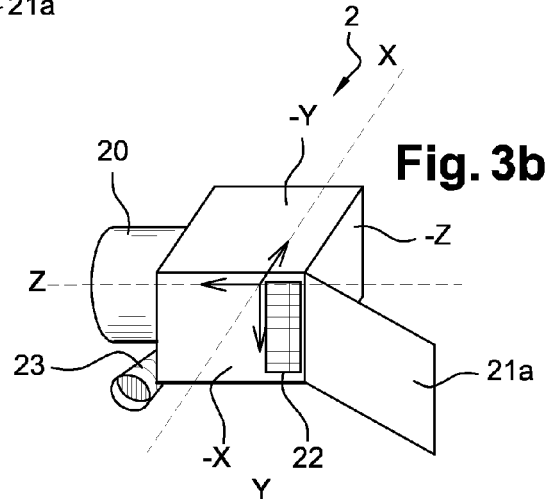
Figure 4A:
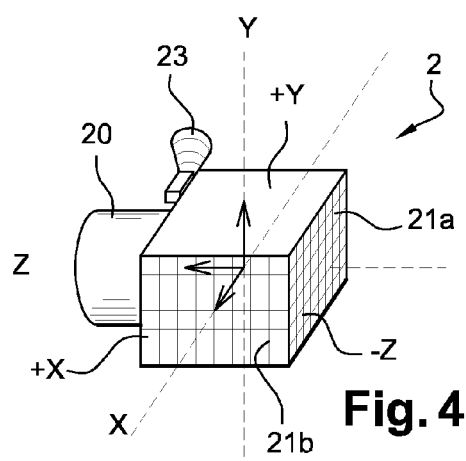
Figure 4B:
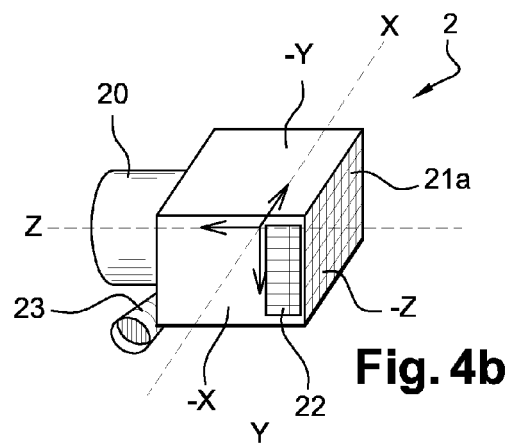

The following description of embodiments of the invention is made with reference to the figures which represent in a non-limiting way:

FIGS. 1a and 1b: two schematic perspective views of an observation satellite,

FIGS. 2a, 2b, 2c and 2d: schematic representations of examples of a satellite's yaw trajectories according to four modes of implementation of a method for attitude control according to the invention, FIGS. 3a and 3b: two schematic perspective views of a first example embodiment of an observation satellite according to the invention, FIGS. 4a and 4b: two schematic perspective views of a second example embodiment of an observation satellite according to the invention.

The present invention relates to a method of satellite attitude control which is applicable to any satellite, in particular observation satellites, in orbit around a celestial object.

For the purposes of describing the modes of the invention, the case of Earth observation satellites is considered, and in particular satellites placed in geostationary or near-geostationary orbit will be used for the remainder of the description.

Such a satellite 1, as shown in FIGS. 1a and 1b, comprises in a known manner at least:
- an observation instrument 10,
- a solar panel 11,
- a radiator 12,
- a star sensor 13 used for instance to estimate the attitude of the satellite 1 and generally pointed towards an area of the sky.

A direction normal to an active surface of the solar panel 11 is equal to a direction $\vec{s}(t)$ of the Sun relative to the satellite 1 when the Sun's rays have an incidence normal to said active surface of the solar panel 11. Similarly, a direction normal to a dissipation surface of the radiator 12 is equal to the direction $\vec{s}(t)$ when the Sun's rays have an incidence normal to said surface of dissipation.

A reference frame associated with the satellite 1 is determined by three oriented orthogonal axes, commonly called roll axis X, pitch axis Y and yaw axis Z, whose directions are denoted $\vec{x}(t)$, $\vec{y}(t)$ and $\vec{z}(t)$, respectively.

The attitude of the satellite can be defined relative to an inertial reference frame, or relative to the local orbital reference frame, through various typical representations: quaternions, transition matrices or Euler angles.

The following conventions will be used for the remainder of the description: roll angle, pitch angle and yaw angle will be used when the attitude is defined by Euler angles as being the angles of rotation about the X, Y and Z axes of the reference frame associated with the satellite. This convention is used for the purpose of simplifying the description; it is understood that the invention remains applicable with any other mathematically equivalent representation of the attitude of the satellite 1.

The directions $\vec{x}(t)$, $\vec{y}(t)$ and $\vec{z}(t)$ define sides +X, −X, +Y, −Y, +Z, and −Z of the satellite 1.

The observation instrument 10, which is for example arranged on the +Z side of satellite 1, has the Z-axis as observation axis and the Y-axis is parallel to the solar panel 11.

Possible sides for carrying the radiator 12 are the +Y, −Y and −X sides. In the example shown in FIG. 1b, the radiator 12 is positioned on the −Y side of the satellite 1, i.e. the side of satellite 1 on the side of negative Y values in the reference frame associated with said satellite.

The star sensor 13 is pointed towards the half space corresponding to the negative X values.

The attitude of the satellite 1 is controlled by roll, pitch and yaw rotations about the X, Y and Z axes, respectively.

The satellite 1 observes the Earth during periods called "activity periods"; each activity period consists generally of a time interval of the orbital period, during which the satellite 1 flies over areas of daylight, that represent for example 50% to 70% of the orbital period.

During an activity period, the method controls the pitch and roll attitudes of the satellite 1 according to an observation mission plan describing different areas on the Earth's surface towards which the Z-axis of the observation instrument 10 must be pointed at predetermined moments.

Each area on the Earth's surface is observed during an observation phase and, between two observation phases, the direction $\vec{z}(t)$ of the Z-axis is changed during a maneuver phase.

Since the satellite's 1 observation mission plan dictates the pitch and roll attitudes of said satellite during the observation phases, the value of the yaw angle about the Z-axis is the only remaining degree of freedom regarding attitude.

According to the method of the invention, the satellite's yaw attitude is controlled such that in observation phases, a dot product between the direction $\vec{s}(t)$ of the Sun and the direction $\vec{x}(t)$ of the X-axis is positive or zero, which implies keeping the Sun in the half-space corresponding to positive X values in the reference frame associated with the satellite during observation phases.

The yaw attitude of the satellite 1 is also controlled such that a solar panel 11 minimum insolation constraint C1 is satisfied at least during the observation phases.

The constraint C1 aims at ensuring that the solar panel insolation is above a minimum insolation, so as to provide electrical power to the payload during observation phases.

For example, the constraint C1 is satisfied when the absolute value of the cosine of an angle between the directions $\vec{y}(t)$ and $\vec{s}(t)$ is less than a positive or zero value V1. The value V1 is preferably between 0 (optimal value for the insolation of said solar panels, for which the directions $\vec{y}(t)$ and $\vec{s}(t)$ are orthogonal) and cos(70°).

In a preferred embodiment of the method, the yaw attitude of the satellite 1 is controlled such that at least one constraint among the following constraints is also satisfied at least during observation phases:

a maximum insolation constraint C2 of the radiator 12;
a maximum insolation constraint C3 of the star sensor 13.

The constraint C2 aims at ensuring that the insolation of the radiator 12 is below a maximum insolation to ensure adequate heat dissipation by the radiator 12 during observation phases.

For example, the constraint C2 is satisfied when the value of the cosine of an angle between the direction normal to the dissipation surface of said radiator and the direction $\vec{s}(t)$ is below a value V2. The value V2 is preferably between 0 (the value below which heat dissipation is optimal) and) cos(70°).

The constraint C3 aims at ensuring that the insolation of the star sensor 13 is below a maximum insolation, to ensure that the Sun is not within a protection cone of the star sensor 13 during observation phases.

For example, constraint C3 is satisfied when the value of the cosine of an angle between the pointing direction of the star sensor 13 and the direction $\vec{s}(t)$ of the Sun is below a value V3. The value V3 is preferably between) cos(60°) and cos(40°).

Other expressions are possible for the constraints C1, C2 and C3. For instance expressions based directly on the values of different angles (rather than their cosines) or expressions taking different angles into consideration are possible, so long as the objectives of the constraints (i.e. the minimum insolation of the solar panel 11, the maximum insolation of the radiator 12 and of the star sensor 13) are met.

In a particular implementation of the method, the yaw attitude of the satellite 1 is substantially constant in observation phases, in order to avoid firstly mechanical disturbances (possibly introduced by yaw maneuvers) and secondly a rotation of the observation instrument 10 during observation phases.

"Substantially constant yaw attitude" means that a constant value of the yaw angle is sought, but that in practice the value of the yaw angle of the satellite 1 may fluctuate around said constant value, in particular because of external disturbances.

In this mode, the yaw attitude is changed during a maneuver phase such that the constraints under consideration are satisfied during the next observation phase.

In another particular embodiment, the solar panel 11 is maintained, at least during observation phases, with a substantially constant orientation within the reference frame associated with the satellite 1, so as to avoid any mechanical disturbances introduced by a rotation of the solar panel 11. It is also possible to have an orientation of the solar panel 11 substantially constant over several consecutive observation phases (and during the maneuver phases inserted between observation phases).

"Substantially constant orientation" means that a constant orientation of the solar panel 11 is sought, but that in practice the orientation of said solar panel can fluctuate around said constant orientation, in particular because of external disturbances.

In the case where the solar panel 11 is equipped with a SADM 111, the orientation of the solar panel 11 is changed for example during a maneuver phase such that the constraint C1 is satisfied during the next observation phase.

In the case where the solar panel 11 is not equipped with a SADM, the substantially constant orientation of the solar panel is chosen by design to have an angle between the direction normal to the active surface of said solar panel 11 and the direction $\vec{z}(t)$ of the Z-axis of between 90° and 180° in the oriented plane (Z,X) (the direction $\vec{x}(t)$ corresponds to a value of 90° and the direction $-\vec{z}(t)$ corresponds to a value of 180°).

In the case where the solar panel 11 is not equipped with a SADM, the minimum insolation constraint C1 of the solar panel 11 is satisfied, for example, when the value of the cosine of an angle between the direction normal to the active surface of said solar panel and the direction $\vec{s}(t)$ is greater than a value V4. The value V4 is preferably between cos(20°) and 1 (optimal value).

In the more general case where the satellite 1 comprises a plurality of solar panels, and/or a plurality of radiators, and/or a plurality of star sensors, the constraints C1, C2 and C3 are satisfied by at least one solar panel, and/or at least a radiator, and/or at least one star sensor.

To control the yaw attitude of the satellite 1, a yaw trajectory $\psi(t)$ is defined, taking into account the constraints used, in particular among the constraints C1, C2 and C3, which are converted into constraints on the value of the yaw angle. Said conversion is performed by using the pitch and roll attitudes of the satellite 1 dictated by the observation mission plan.

Upper $\psi_M(t)$ and lower $\psi_m(t)$ limit trajectories are determined by this conversion. The limit trajectories $\psi_M(t)$ and $\psi_m(t)$ are such that a yaw trajectory $\psi(t)$ such that $\psi_m(t) \leq \psi(t) \leq \psi_M(t)$ in observation phases meets the constraints under consideration.

Examples of upper $\psi_M(t)$ and lower $\psi_m(t)$ limit trajectories are represented respectively as references $\psi_M$ and $\psi_m$ on FIGS. 2a, 2b, 2c and 2d, which represent the values of the yaw angle $\psi(t)$, expressed in degrees, versus time t, expressed in hours.

The yaw trajectory $\psi(t)$ to be implemented to control the yaw attitude of the satellite 1 is then defined between the upper $\psi_M(t)$ and lower $\psi_m(t)$ limit trajectories, at least for the activity period, possibly taking into account yaw attitude constraints of the satellite 1 substantially constant during observation phases.

In a particular embodiment of the method, the yaw attitude of the satellite 1 is controlled during activity periods so as to maximize the insolation of the solar panel 11.

The corresponding yaw trajectory $\psi(t)$ is determined by pointing the Y-axis according to the observation mission plan, to determine for the direction $\vec{z}(t)$ of the Z-axis the direction $\vec{y}(t)$ of the Y-axis according to the vector equality:

$$\vec{y}(t) = \alpha \vec{z}(t) \wedge \vec{s}(t)$$

expression in which $\wedge$ represents the cross product and $\alpha$ is a normalization factor equal to $1/\|\vec{z}(t) \wedge \vec{s}(t)\|$ if $\vec{y}(t)$ is a unit vector.

An example of yaw trajectory thus determined is shown in FIG. 2a under reference $\psi_1$.

According to the previous vector equality, the Sun is always in the (Z,X) plane and the directions $\vec{y}(t)$ and $\vec{s}(t)$ are orthogonal, which is optimal for the insolation of the solar panel 11. In addition, the Sun is always in the half-space corresponding to positive X values, which is optimal for the star sensor 13 which is directed towards the half-space corresponding to negative X values, and the Sun's rays are advantageously orthogonal to the direction normal to the active surface of the radiator 12.

In another mode of implementation of the method, the yaw attitude of the satellite 1 is controlled during activity periods so as to minimize the necessary changes in yaw between instants t(m) of the operating period, $1 \leq m \leq M$.

The change in yaw between two instants t(m+1) and t(m), for which the yaw angle is respectively ψ(m+1) and ψ(Mm), is defined by (ψ(m+1)−ψ(m))/(t(m+1)−t(m)).

At least M−1 yaw variations are to be determined and the yaw trajectory ψ(t) is determined by minimizing a norm of changes in yaw, said norm being considered in a space of dimension M−1, subject to the constraint of the upper $\psi_M(t)$ and lower $\psi_m(t)$ limit trajectories, i.e. by imposing $\psi_m(m) \leq \psi(m) \leq \psi_M(m)$ ($1 \leq m \leq M$).

The yaw trajectory ψ(t) is determined for example by minimizing the norm 1 of yaw variations, i.e. by minimizing the expression:

$$\sum_{m=1}^{M-1} \frac{|\psi(m+1) - \psi(m)|}{t(m+1) - t(m)}.$$

An example of such a trajectory is shown in FIG. 2b, under reference $\psi_2$.

In another particular embodiment of the method, the yaw attitude of the satellite 1 is controlled during activity periods such that only tilts of multiples of 90° are allowed, i.e. the yaw angle can only take 4 different values.

The yaw trajectory ψ(t) thus obtained is particularly advantageous in the case where the satellite 1 observes one or more areas of the Earth's surface on a regular basis during the activity period, particularly in cases where the observation instrument 10 comprises a square sensor as main sensor, and for an observation mission in geostationary orbit.

In this case, the images obtained for a same area after yaw rotations that are either zero or correspond to multiple 90° tilts overlap, bringing the following advantages in particular:

- a usable area of the images, i.e. the portion of the observed area present in all the images, which is maximized with respect to yaw rotations without constraints which tend to reduce the usable area of the images to a disc located at the center of said images;
- processing to reframe the images is reduced to mere 90° rotations.

An example of such a yaw trajectory is shown in FIG. 2c, under reference $\psi_3$.

In a variant of the preceding mode of implementation, the yaw attitude of the satellite 1 is controlled during activity periods such that only 180° rolls are allowed, i.e. that the yaw angle can only take 2 different values. This variant has the same advantages as above where the observation instrument 10 comprises as main sensor a line detector acquiring the images by scanning.

An example of such a yaw trajectory is shown in FIG. 2d, under reference $\psi_4$.

Outside of activity periods, the attitude of the satellite 1 is controlled for example by using a constant Z-axis direction, for example a geocentric pointing or the direction corresponding to the first area observed in a subsequent observation phase, and by implementing a yaw trajectory according to one of the previous modes.

In FIGS. 2a, 2b, 2c and 2d, the time intervals outside activity periods are represented by the reference N (approximately between 7 pm and 5 am local time, in other words when the satellite overflies night areas), while the activity period is represented by the reference J.

The invention also relates to the satellite attitude controlled according to the method, such as the satellite 1 equipped with a SADM 111 shown in FIGS. 1a and 1b for example.

The satellite 1 comprises a guidance and attitude control system for controlling the attitude of the satellite according to the mission plan and the yaw trajectory ψ(t).

The yaw trajectory ψ(t) is either determined by the computing means (MCU, computer with a microprocessor, etc.) of the satellite 1, or determined by a station that can be a ground station or another satellite and transmitted from said station to the satellite 1, which comprises in this case appropriate means for downloading at least said yaw trajectory, for example a radioelectrical or optical telecommunications device.

A particularly advantageous configuration of the solar panel or panels and of the radiator or radiators of a satellite attitude controlled by the method according to the invention is described below.

A satellite 2, shown in FIGS. 3a and 3b, includes at least:
- an observation instrument 20,
- a solar panel 21a,
- a radiator 22,
- a star sensor 23.

As for satellite 1, a reference frame associated with the satellite 2 is defined by three oriented orthogonal axes X, Y and Z, whose directions are $\vec{x}(t)$, $\vec{y}(t)$ and $\vec{z}(t)$ respectively, defining the sides +X, −X, +Y, −Y, +Z et −Z of the satellite 2.

The Z-axis is parallel to an observation axis of the observation instrument 20 (for example arranged on the +Z side of the satellite 2), and the Y-axis is parallel to the solar panel 21a.

As for satellite 1, the satellite 2 has a satellite guidance and attitude control system based on the mission plan and the yaw trajectory ψ(t), and said yaw trajectory is either determined by computation means of the satellite 2, or downloaded from a station via downloading means.

Preferably, the radiator 22 is arranged on the −X side of the satellite 2, as shown in FIG. 3b.

The solar panel 21a, substantially flat and rigid, is fixed at the interface of the −X and −Z sides of the satellite 2. The solar panel 21a is not equipped with a SADM and has a fixed orientation in the reference frame (X, Y, Z). The satellite 2 possibly has means to deploy said solar panel when said satellite is placed in orbit, but the orientation of said solar panel is fixed after deployment operations.

The solar panel 21a is arranged such that the value of an angle between a direction normal to an active surface of said solar panel and the direction of the Z-axis is between 90° and 180°, for example 135°.

Considering an activity period representing less than 70% of the orbital period corresponding to the overflight of daylight areas by the satellite, the Sun is completely behind the satellite 2 relative to the Z-axis of said satellite during operations such that the −Z side is almost always insolated.

In addition, the satellite 2 is controlled in yaw such that the Sun is in the half space corresponding to positive X values, and the +X side is almost always insolated.

The mean direction of the Sun during activity periods, in the (Z,X) plane, is therefore between the directions $-\vec{z}(t)$ and $\vec{x}(t)$, and makes an angle of between 90° and 180° with the direction $\vec{z}(t)$ of the Z-axis, with a value close to 135°. The mean direction of the Sun in the (Z,X) plane is thus close to the direction normal to the active surface of the solar panel 21a of the satellite 2 according to the invention, thus ensuring almost constant insolation of the fixed solar panel 21a during activity periods without requiring a SADM.

To compensate for the loss of normal incidence of the Sun's rays on the solar panel 21a, the size of the active surface of the solar panel 21a is for example substantially larger than the size of the active surface of the solar panel 11 of the satellite 1 equipped with a SADM.

More generally, a satellite according to the invention comprises a plurality of solar panels, which are positioned on the satellite such that the mean direction of directions normal to the active surfaces of said solar panels, possibly weighted by the area of said active surfaces, makes an angle of between 120° and 150° with the direction of the Z-axis.

For example, FIGS. 4a and 4b show a similar embodiment of the satellite 2, comprising two solar panels 21a and 21b, not equipped with a SADM.

The solar panel 21a is arranged on the −Z side of the satellite 2, and the solar panel 21b is arranged on the +X side of said satellite. The two solar panels 21a and 21b have substantially the same areas, and the mean direction of their normal directions makes an angle substantially equal to 135° with the direction of the Z-axis.

The example of embodiment shown in FIGS. 4a and 4b is also particularly advantageous because the solar panels do not have to be deployed, and do not require deployment means.

The attitude control method according to the invention allows, for satellites making observations during an activity period representing a significant percentage of time of the orbital period, combining Earth observation and verification of constraints related to the Sun, and also allows satellites having particularly simple configurations.

The invention claimed is:

1. Method for controlling the attitude of a satellite (1,2) in orbit around a celestial object, said satellite comprising at least:
    an observation instrument (10,20),
    a solar panel (11,21a),
    a radiator (12,22),
    a star sensor (13,23),
arranged on the satellite (1,2) such that, in a reference frame associated with said satellite and defined by three orthogonal axes X, Y, Z:
    the observation axis of the observation instrument (10,20) is parallel to the Z-axis,
    the solar panel (11,21a) is parallel to the Y-axis,
    the radiator (12,22) is arranged on one of the sides −X, +Y, or −Y of the satellite,
    the star sensor (13,23) is directed toward the half space corresponding to the negative X values,
in which said method, the attitude of the satellite (1,2) is controlled during an activity period (J) around the X-axis for roll control and around the Y-axis for pitch control to point one direction $\vec{z}(t)$ of the axis of observation of the observation instrument (10,20) towards areas to be observed of the celestial object, said process being characterized in that the yaw attitude around the Z-axis of the satellite (1,2) is controlled to keep the Sun on the side of the half-space corresponding to positive X values and to ensure that a minimum insolation of the solar panel (11,21a) constraint C1 is satisfied during observation phases of the activity period (J).

2. Method according to claim 1, wherein the yaw attitude of the satellite (1,2) is controlled such that a radiator (12,22) maximum insolation constraint C2 is satisfied during the observation phases.

3. Method according to claim 1, wherein the yaw attitude of the satellite (1,2) is controlled such that a star sensor (13,23) maximum insolation constraint C3 is satisfied during the observation phases.

4. Method according to claim 1, wherein the yaw attitude of the satellite (1,2) is substantially constant during at least one observation phase.

5. Method according to claim 1, wherein the orientation of the solar panel (11,21a) is substantially constant in the reference frame associated with the satellite (1,2) during at least one observation phase.

6. Method according to claim 1, wherein the yaw attitude of the satellite (1,2) is controlled during the activity period (J) such that for each area to be observed a direction $\vec{y}(t)$ of the Y-axis is oriented according to the cross product:

$$\vec{y}(t) = \alpha \vec{z}(t) \wedge \vec{s}(t),$$

where α is a normalization factor and $\vec{s}(t)$ is the direction of the Sun with respect to said satellite.

7. Method according to claim 1, wherein the yaw attitude of the satellite (1,2) is controlled during the activity period (J) such that a norm of yaw variations performed between predetermined instants of said activity period is minimized.

8. Method according to claim 1, wherein the yaw attitude of the satellite (1,2) is controlled during the activity period (J) by allowing only rotations in multiples of 90°.

9. Method according to claim 1, wherein the yaw attitude of the satellite (1,2) is controlled during the activity period (J) by allowing only rotations in multiples of 180°.

10. Satellite (1,2) designed to be placed in orbit around a celestial object comprising at least:
    an observation instrument (10,20),
    a solar panel (11,21a),
    a radiator (12,22),
    a star sensor (13,23),
arranged on the satellite (1,2) such that, in a reference frame associated with said satellite and defined by three orthogonal axes X, Y, Z:
    the observation axis of the observation instrument (10,20) is parallel to the Z-axis,
    the solar panel (11,21a) is parallel to the Y-axis,
    the radiator (12,22) is arranged on one of the sides −X, +Y, or −Y of the satellite,
    the star sensor (13,23) is directed toward the half space corresponding to the negative X values,
said satellite comprising a guidance and attitude control system for controlling the attitude of said satellite using a method according to claim 1.

11. Satellite (1,2) according to claim 10, comprising means of computing a yaw trajectory used to control the yaw attitude of said satellite.

12. Satellite (1,2) according to claim 10, comprising means of downloading from a station a yaw trajectory used to control the yaw attitude of said satellite.

13. Satellite (2) according to claim 10, wherein the radiator (22) is arranged on the −X side of said satellite.

14. Satellite (2) according to claim 10, wherein the solar panel (21a) is fixed, except possibly during deployment operations, and arranged such that a direction normal to an active surface of said solar panel makes an angle of between 90° and 180° with the direction of the Z-axis.

15. Satellite (2) according to claim 14, comprising a plurality of fixed solar panels (21a,21b), except possibly during deployment operations, arranged such that a mean direction of directions normal to the active surfaces of said solar panels makes an angle of between 120° and 150° with the direction of the Z-axis.

16. Method according to claim 2, wherein the yaw attitude of the satellite (1,2) is controlled such that a star sensor (13,23) maximum insolation constraint C3 is satisfied during the observation phases.

17. Satellite (2) according to claim 11, wherein the radiator (22) is arranged on the −X side of said satellite.

18. Satellite (2) according to claim 11, wherein the solar panel (21a) is fixed, except possibly during deployment operations, and arranged such that a direction normal to an active surface of said solar panel makes an angle of between 90° and 180° with the direction of the Z-axis.

19. Satellite (2) according to claim 12, wherein the radiator (22) is arranged on the −X side of said satellite.

20. Satellite (2) according to claim 12, wherein the solar panel (21a) is fixed, except possibly during deployment operations, and arranged such that a direction normal to an active surface of said solar panel makes an angle of between 90° and 180° with the direction of the Z-axis.

* * * * *

UNITED STATES PATENT AND TRADEMARK OFFICE
CERTIFICATE OF CORRECTION

PATENT NO.        : 8,505,853 B2                                          Page 1 of 1
APPLICATION NO.   : 12/997017
DATED             : August 13, 2013
INVENTOR(S)       : Lagadec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this
Fifteenth Day of September, 2015

Michelle K. Lee
*Director of the United States Patent and Trademark Office*